May 29, 1928.

J. ZUBATY 1,671,920

INSTRUMENT DIAL ILLUMINATION

Filed Jan. 20, 1927

Inventor
Joseph Zubaty
By Blackmore, Spencer & Hulit
Attorneys

Patented May 29, 1928.

1,671,920

UNITED STATES PATENT OFFICE.

JOSEPH ZUBATY, OF FLINT, MICHIGAN, ASSIGNOR TO A C SPARK PLUG COMPANY, OF FLINT, MICHIGAN, A COMPANY OF MICHIGAN.

INSTRUMENT-DIAL ILLUMINATION.

Application filed January 20, 1927. Serial No. 162,391.

This invention relates to illuminating means for instrument panels and particularly to the type described and claimed in my prior application S. N. 47,058 filed July 30, 1925. In this application light, preferably from a source at the rear of the instrument board, is projected upon the dials of the instruments contained within a casing, at the rear of a cover plate having apertures through which the dials are exposed to view. Where this or any other type of indirectly lighted instrument assembly is employed, certain sections of the dials may be improperly illuminated, particularly where the instrument in question is located at the far corner of the assembly. This defect in lighting is particularly objectionable where the instrument is one requiring frequent observation, as, for example, the dash thermometer now commonly provided upon automobiles. To overcome this difficulty I have distorted the defectively lighted portion of the instrument dial in a direction to receive a greater quantity of light. Thus in applying my invention to a dash thermometer I have deflected rearwardly the danger portion of the scale, which is usually colored red, so that it receives a larger quantity of light from the source. With this added illumination there can be no mistaking the reading should the pointer swing to the danger portion of the scale.

Figure 1:
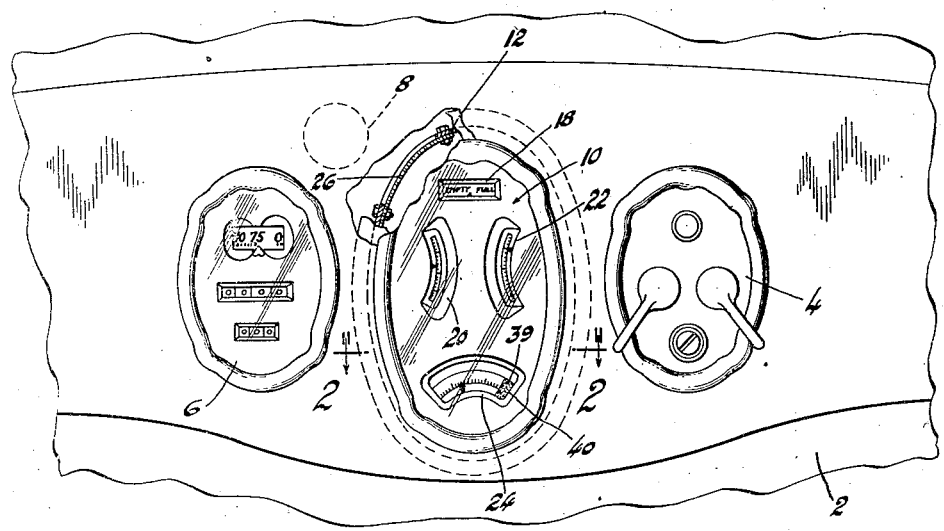
Fig. 1 is a front elevation, with parts broken away showing an instrument panel to which my invention has been applied.
Figure 2:
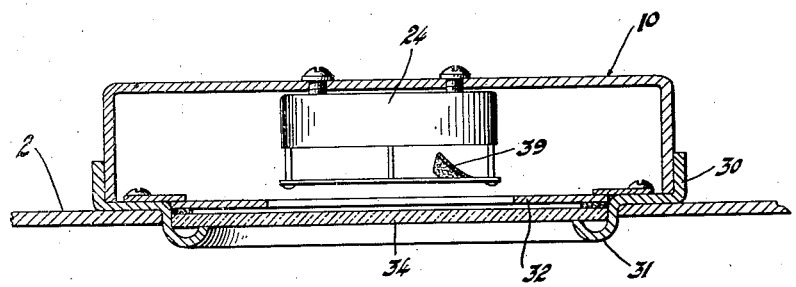
Fig. 2 is a section on line 2—2 of Figure 1.

On the drawing reference character 2 indicates the conventional instrument panel mounted upon the dash of the automobile. The switch assembly is indicated by the reference character 4 and the speedometer by the reference character 6. 8 indicates a source of light preferably in the form of a bulb mounted at the rear of the panel and arranged to illuminate the speedometer 6, by means not shown, and the instrument assembly 10 in the following manner. Assembly 10 consists of a casing 12 in which a number of instruments are housed. Thus I have shown mounted within the casing a gasoline gauge 18, oil gauge 20, ammeter 22 and thermometer 24. At its upper portion adjacent the light source the casing is provided with a window 26, covered by some suitable transparent medium. The front of the casing is closed by means of cover 30, having a projecting bead 31 within which is secured face-plate 32, having apertures for the display of the instrument dials, the face-plate being protected by the usual glass 34. It is obvious that the lowermost instrument, in this case the thermometer, is farthest removed from the light source and consequently receives the least light. It is likewise obvious that the most remote portion of the scale will be the least satisfactorily lighted and as this portion bears the high temperature readings which indicate unsatisfactory engine operating conditions, lack of readability of this portion of the scale may cause serious trouble. To overcome this difficulty I have severed the danger portion 39 of the scale from the remaining portion along the line 40 and have deflected portion 39 to the rear in a direction to receive a greater quantity of light from the source. By this means the danger portion of the scale is rendered easily legible at all times.

It is obvious that this expedient may be employed with other types of lighting arrangements, although of course it is most advantageous where light is supplied to the dial from a point at the rear of the face-plate.

I claim:

1. An instrument including a dial having a portion indicating normal operating conditions and a portion indicating abnormal operating conditions, said last named portion being distorted rearwardly with respect to the plane of the first-named portion to permit increased illumination.

2. The combination of an instrument cover having an opening therein, an instrument having its indicating dial exposed in the opening, a source of light concealed by the cover and arranged to project light on the dial, said dial being provided with a portion bent rearwardly from the cover so as to receive a greater quantity of light from the source for the better illumination of the indicia carried thereby.

In testimony whereof I affix my signature.

JOSEPH ZUBATY.